United States Patent Office 3,563,984
Patented Feb. 16, 1971

3,563,984
OXAZOLO[2,3-b]PYRIMIDO[4,5-d][1,3]OXAZINONES
Dong H. Kim, Wayne, and Arthur A. Cantilli, Havertown, Pa., assignors to American Home Products Corporation, New York, N.Y., a corporation of Delaware
No Drawing. Filed Dec. 20, 1968, Ser. No. 785,768
Int. Cl. C07d 85/48
U.S. Cl. 260—244         7 Claims

ABSTRACT OF THE DISCLOSURE 4-(substituted)-pyrimidine carboxylic acid esters are produced by reaction of a 5-carbethoxy-4-chloropyrimidine with alkanolamine or derivatives thereof. After hydrolysis to the corresponding acids, the compounds are treated with an acid anhydride forming oxazolo[2,3-b]pyrimido[4,5-d][1,3]oxazine-5-ones. The latter compounds are central nervous system depressants.

This invention relates to the preparation of pyrimidine carboxylic acids which are then cyclized to novel oxazolo[2,3-b]pyrimido[4,5-d][1,3]oxazinones that are pharmacologically useful.

The final compounds of the invention may be illustrated by the following structural formula:

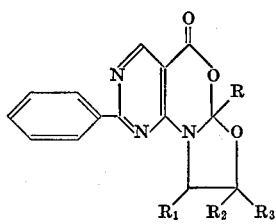

In the formula shown, R is a lower alkyl of 1 to 2 carbon atoms with $R_1$ and $R_3$ each standing for hydrogen or lower alkyl while $R_2$ is intended to represent hydrogen, lower alkyl, phenyl, or halophenyl.

The term "lower alkyl," unless otherwise limited is intended to mean alkyls of 1 to 4 carbon atoms, while the term "halophenyl" is intended to mean chlorine, bromine, or fluorine in the ortho, meta, or para positions of the phenyl ring.

The compounds are prepared according to the following reaction scheme, the symbols R, $R_1$, $R_2$, and $R_3$ having the meanings described above:

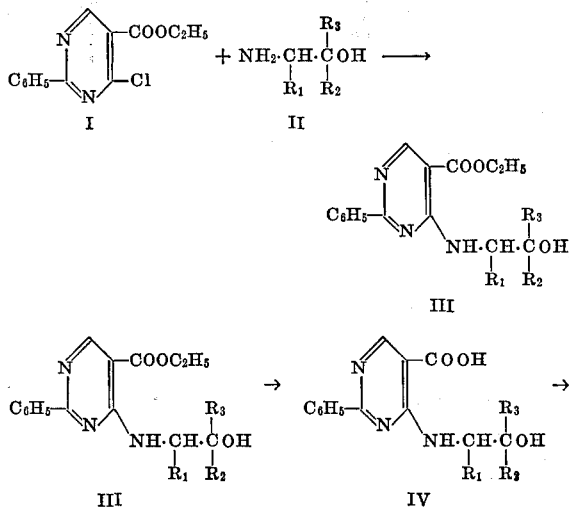

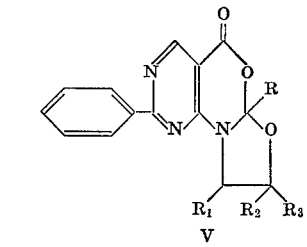

In carrying out the process as indicated above, 5-carbethoxy-4-chloro-2-phenylpyrimidine is reacted with an alkanolamine in an inert solvent, forming the corresponding 5-carbethoxy-4-hydroxyalkylamino pyrimidine (Compound III). The latter is then subjected to alkaline hydrolysis forming the 5-carboxylic acid (Compound IV).

The 5-carboxylic acid compound is then cyclized using an acid anhydride at refluxing temperature to form an 8,9-dihydro-6a-methyl-2-phenyl 5H,6aH - oxazolo[2,3-b]pyrimido[4,5-d][1,3]-ozazin-5-one (Compound V).

The following examples illustrate the various steps of the reaction procedure in greater detail but are not intended to be limitative of the invention. It is to be understood that the temperatures are in degrees centigrade.

EXAMPLE 1

4-(2-hydroxyethylamino)-2-phenyl-5-pyrimidine-carboxylic acid, ethyl ester

Eighteen grams of 5-carbethoxy-4-chloro-2-phenylpyrimidine was added in small portions to a solution containing 30 ml. of 2-hydroxyethylamine in 70 ml. of absolute ethanol. Heat was evolved during the addition. The resulting mixture was heated on a steam bath for 7 minutes. The solvent was removed under reduced pressure to give an oil which solidified on chilling and scratching. The product weighed 6.0 g. and melted at 128–133°. Recrystallization from absolute ethanol increased the M.P. to 134–136°.

Analysis.—Calcd. for $C_{15}H_{17}N_3O_3$ (percent): C, 62.70; H, 5.96; N, 14.63. Found (percent): C, 62.59; H, 5.76; N, 14.77.

EXAMPLE 2

4-(2-hydroxypropylamino)-2-phenyl-5-pyrimidine-carboxylic acid, ethyl ester

The title compound was prepared as in Example 1 from 13 g. of 5-carbethoxy-4-chloro-2-phenylpyrimidine, 30 ml. of 1-amino-2-propanol, and 40 ml. of absolute ethanol, to give 13.6 g. of product by chilling the reaction mixture, M.P. 98–100°.

Analysis.—Calcd. for $C_{16}H_{19}N_3O_3$ (percent): C, 63.77; H, 6.36; N, 13.95. Found (percent): C, 63.45; H, 6.11; N, 14.00.

EXAMPLE 3

4-(1-hydroxymethylpropylamino)-2-phenyl-5-pyrimidine-carboxylic acid, ethyl ester Two and six-tenth grams of 5-carbethoxy-4-chloro-2-phenylpyrimidine was added in small portions to 12 ml. of dimethylformamide containing 0.9 g. of 2-amino-1-butanol and 1.0 g. of sodium carbonate (powdered) under mechanical stirring. After being stirred for 30 min. at room temperature, the reaction mixture was heated to boiling for 5 min., then poured into 250 ml. of cold water, whereby an oil deposited. The aqueous layer was decanted, and fresh water was added. The oil was solidified on chilling and scratching to give 2.5 g. of product, M.P. 91–100°. Recrystallization from ethanol increased M.P. to 103–105°.

EXAMPLE 4

4-(2-o-chlorophenyl-2-hydroxyethylamino)-2-phenyl-5-pyrimidinecarboxylic acid, ethyl ester The title compound was prepared as in Example 3 from 5-carbethoxy-4-chloro-2-phenylpyrimidine, 2-(o-chlorophenyl)ethanolamine and absolute ethanol. The product was recrystallized from absolute ethanol, M.P. 164–166°.

*Analysis.*—Calcd. for $C_{21}H_{20}ClN_3O_3$ (percent): C, 63.40; H, 5.07; N, 10.56; Cl, 8.91. Found (percent): C, 63.55; H, 5.00; N, 10.83; Cl, 8.76.

EXAMPLE 5

4-(2-hydroxyethylamino)-2-phenyl-5-pyrimidinecarboxylic acid

Thirteen grams of 4-(2-hydroxyethylamino)-2-phenyl-5-pyrimidinecarboxylic acid, ethyl ester was added to a mixture of 20% aqueous NaOH solution (50 ml.) and absolute ethanol (20 ml.), and the resulting mixture was refluxed for 15 min. Acidification of the reaction mixture with dilute hydrochloric acid caused separation of precipitates which were collected on a filter and washed with water. The product weighed 10 g. and melted at 244–246° dec.

*Analysis.*—Calcd. for $C_{13}H_{13}N_3O_3$ (percent): C, 60.22; H, 5.05; N, 16.21. Found (percent): C, 60.49; H, 5.29; N, 16.01.

EXAMPLE 6

4-(2-hydroxypropylamino)-2-phenyl-5-pyrimidinecarboxylic acid

Ten grams of 4-(2-hydroxypropylamino)-2-phenyl-5-pyrimidinecarboxylic acid, ethyl ester was added to a mixture of 20% aqueous NaOH solution (50 ml.) and absolute ethanol (20 ml.), and the resulting mixture was refluxed for 10 min. Acidification of the reaction mixture with dilute hydrochloric acid caused separation of a precipitate which was collected on a filter and washed with water. The product weighed 9.0 g. and melted at 241.5–242.5° dec.

*Analysis.*—Calcd. for $C_{14}H_{15}N_3O_3$ (percent): C, 61.53; H, 5.53; N, 15.38. Found (percent): C, 61.48; H, 5.24; N, 15.34.

EXAMPLE 7

4-(2-o-chlorophenyl-2-hydroxyethylamino)-2-phenylpyrimidinecarboxylic acid

The title compound was prepared from its ethyl ester (3.0 g.) by alkaline hydrolysis as in Example 5. The product weighed 2.4 g. and melted at 238–240° dec.

*Analysis.*—Calcd. for $C_{19}H_{16}ClN_3O_3$ (percent): C, 61.71; H, 4.36; N, 11.36; Cl, 9.59. Found (percent): C, 61.63; H, 4.69; N, 11.50; Cl, 9.75.

EXAMPLE 8

4-(1-hydroxymethylpropylamino)-2-phenyl-5-pyrimidinecarboxylic acid

The title compound was prepared from its ethyl ester (1.2 g.) as in Example 5 to give 1.1 g. of product, M.P. 254–257°. An analytical sample obtained by recrystallization from dimethyl formamide and water melted at 258–261° dec.

*Analysis.*—Calcd. for $C_{15}H_{17}N_3O_3$ (percent): C, 62.70; H, 5.96; N, 14.63. Found (percent): C, 62.63; H, 5.94; N, 14.33.

EXAMPLE 9

4-(2-hydroxy-2-methylpropylamino)-2-phenyl-5-pyrimidinecarboxylic acid, ethyl ester To a solution containing 26 g. of 2-hydroxy-2-methylpropylamine in 60 ml. of absolute ethanol was added in small portions 15 g. of 5-carbethoxy-4-chloro-2-phenylpyrimidine with gentle heating and stirring. The resulting mixture was heated on a steam bath for 10 minutes. After removing most of ethanol under reduced pressure, the concentrated reaction mixture was poured into 300 ml. of cold water whereby an oil separated. Chilling and scratching caused solidification of the oil. The solid material was collected on a filter, and washed with water several times to give 16 g. of product, 76–87°. Recrystallization from petroleum ether (30–60°) raised the M.P. to 89.5–92°.

*Analysis.*—Calcd. for $C_{17}H_{21}N_3O_3$ (percent): C, 64.74; H, 6.71; N, 13.33. Found (percent): C, 65.10; H, 6.84; N, 13.53.

EXAMPLE 10

4-(2-hydroxy-2-methylpropylamino)-2-phenyl-5-pyrimidinecarboxylic acid

Sixteen grams of 4-(2-hydroxy-2-methylpropylamino)-2-phenyl-5-pyrimidinecarboxylic acid, ethyl ester was added to a mixture of 20% aqueous NaOH solution (40 ml.) and absolute ethanol (40 ml.), and the resulting mixture was refluxed for 10 minutes. After being cooled to room temperature, the reaction mixture was acidified with dilute hydrochloric acid. The precipitate which formed was collected on a filter, and washed with water several times to give 12.7 g. of product, M.P. 239–241° dec.

*Analysis.*—Calcd. for $C_{15}H_{17}N_3O_3$ (percent): C, 62.70; H, 5.96; N, 14.63. Found (percent): C, 62.45; H, 5.65; N, 14.43.

EXAMPLE 11

8,9-dihydro-6a-methyl-2-phenyl-5H,6aH-oxazolo[2,3-b]pyrimido[4,5-d][1,3]oxazin-5-one A mixture of 4-(2-hydroxyethylamino)-2-phenyl-5-pyrimidinecarboxylic acid (1.5 g.) and acetic anhydride (30 ml.) was heated to obtain a clear solution. The resulting solution was refluxed for ½ hour, and the excess acetic anhydride was distilled off under reduced pressure to give an oil which solidified on chilling. The solid was collected on a filter and washed with acetone giving 1.1 g. of product, M.P. 176–178°. Recrystallization from acetone afforded an analytical sample, M.P. 176–179°.

*Analysis.*—Calcd. for $C_{15}H_{13}N_3O_3$ (percent): C, 63.59; H, 4.63; N, 14.83. Found (percent): C, 63.75; H, 4.63; N, 14.86.

EXAMPLE 12

8,9-dihydro-6a,8-dimethyl-2-phenyl-5H,6aH-oxazolo[2,3-b]pyrimido[4,5-d][1,3]oxazin-5-one The title compound was prepared as in Example 11 from 2.0 g. of 4-(2-hydroxypropylamino)-2-phenyl-5-pyrimidinecarboxylic acid and 35 ml. of acetic anhydride to give 1.4 g. of product, M.P. 165–168°. Recrystallization from acetic anhydride increased the M.P. to 166–168.5°.

*Analysis.*—Calcd. for $C_{16}H_{15}N_3O_3$ (percent): C, 64.63; H, 5.09; N, 14.14. Found (percent): C, 64.31; H, 4.78; N, 13.93.

EXAMPLE 13

8-(o-chlorophenyl)-8,9-dihydro-6a-methyl-2-phenyl-5H,6aH-oxazolo[2,3-b]pyrimido[4,5-d][1,3]oxazin-5-one The title compound was prepared as in Example 11 from 2.0 g. of 4-[(2-o-chlorophenyl-2-hydroxy)ethylamino]-2-phenylpyrimidinecarboxylic acid and 34 ml. of acetic anhydride to give 1.7 g. of product, M.P. 188–190°. Recrystallization from acetic anhydride increased M.P. to 189–191°.

*Analysis.*—Calc'd for $C_{21}H_{16}ClN_3O_3$ (percent): C, 64.04; H, 4.10; N, 10.67; Cl, 9.00. Found (percent): C, 64.04; H, 4.05; N, 10.74; Cl, 9.06.

EXAMPLE 14

9-ethyl-8,9-dihydro-6a-methyl-2-phenyl-5H,6aH-oxazolo-[2,3-b]pyrimido[4,5-d][1,3]oxazin-5-one The title compound was prepared as in Example 11 from 4 - (1 - hydroxymethylpropylamino) - 2 - phenyl-5-pyrimidinecarboxylic acid (1.5 g.) and acetic anhydride (30 ml.) to give 0.2 g. of product, M.P. 179–183°.

*Analysis.*—Calc'd for $C_{17}H_{17}N_3O_3$ (percent): C, 65.58; H, 5.50; N, 13.50. Found (percent): C, 65.79; H, 5.51; N, 13.51.

EXAMPLE 15

8,9-dihydro-6a,8,8-trimethyl-2-phenyl - 5H,6aH - oxazolo-[2,3-b]pyrimido[4,5-d][1,3]oxazin-5-one and 1,2-dihydro-2,2-dimethyl - 8 - phenyl - 5H - oxazolo[2′,3′,6,1]pyrido[2,3-d]pyrimidine-5-one A mixture of 4-(2-hydroxy - 2 - methylpropylamino)-2-phenyl-5-pyrimidinecarboxylic acid (3.0 g.) and acetic anhydride (50 ml.) was heated to obtain a clear solution. The resulting solution was refluxed for 0.5 hour, and most of the excess acetic anhydride was distilled under reduced pressure. The concentrated solution was filtered under suction while hot. Chilling of the filtrate caused separation of crystals which were collected on a filter to give a product identified as 1,2-dihydro-2,2-dimethyl-8-phenyl - 5H - oxazolo[2′,3′,6,1]pyrido[2,3-d]pyrimidine-5-one, M.P. 243–248°. Recrystallization from acetic anhydride raised the M.P. to 251–252°. Concentration of mother liquor and subsequent chilling caused separation of 8,9-dihydro-6a,8,8-trimethyl-2-phenyl-5H,6aH-oxazolo[2,3-b]pyrimido[4,5 - d][1,3]oxazin - 5 - one; M.P. 138–140.5°.

*Analysis.*—Calc'd for $C_{17}H_{17}N_3O_3$ (percent): C, 65.68; H, 5.50; N, 13.50. Found (percent): C, 65.63; H, 5.21; N, 13.23.

The procedures of Examples 11 to 15 may be followed but substituting an equivalent amount of propionic acid anhydride for the acetic anhydride reactant. This will then produce the corresponding 6a-ethyl compounds.

The oxazolo[2,3-b]pyrimido[4,5-d][1,3]oxazinones of the invention have pharmacological activity and utility when tested in mice under pharmacologically acceptable standard procedures. It has been found that these compounds are central nervous system depressants and may be used as such in experimental and comparative pharmacology with other compounds known or suspected to have similar activity.

The following procedure will illustrate how to use the compounds for the indicated purpose and effects.

The compound to be evaluated is administered orally to three mice (CF–1 14 to 24 grams) at each of the following doses: 400, 127, 40, and 12.7 mg./kg.

The animals are watched for a minimum of two hours during which time signs of general stimulation (i.e. increased spontaneous motor activity, hyperactivity on tactile stimulation, twitching), general depression (i.e. decreased spontaneous motor activity, decreased respiration) and autonomic activity (i.e. miosis, mydriasis, diarrhea) are noted. The animals are tested for changes in reflexes (i.e. flexor, extensor) and are rated by use of a pole climb and inclined screen for the presence of sedationataxia.

If the compound demonstrates no activity following oral administration, the procedure is repeated following intraperitoneal administration.

Under the testing procedure described, the compounds of the invention were found to demonstrate central nervous system depressant activity at a dosage range of 127 to 400 mg./kg. of body weight, injected i.p. with no notable toxicity found at the top of the range.

The compounds may be used either orally or parenterally, either alone or combined with other active ingredients, or in combination with inert substances acting as a carrier or vehicle. Aqueous or oleaginous vehicles are contemplated, and such known and acceptable excipients as lactose, talc, carboxymethyl cellulose, etc., may be used as carriers, extenders, or suspending agents.

The invention that is claimed is:

1. A compound having the formula:

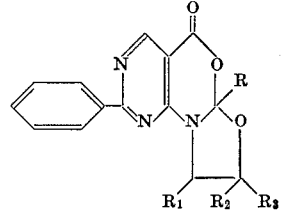

wherein

R represents methyl or ethyl;

$R_1$ and $R_3$ each represents a member of the group consisting of hydrogen and lower alkyl of 1 to 4 carbon atoms; and $R_2$ represents a member of the group consisting of hydrogen, lower alkyl of 1 to 4 carbon atoms, phenyl and substituted phenyl, the substituent being selected from the group consisting of chlorine, bromine and fluorine.

2. A compound of claim 1; having the formula:

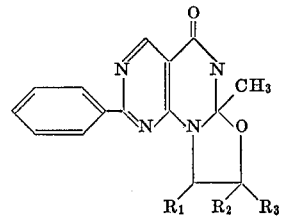

wherein $R_1$ is a member of the group consisting of hydrogen and ethyl;

$R_2$ is a member of the group consisting of hydrogen, methyl, and chlorophenyl; and $R_3$ is a member of the group consisting of hydrogen and methyl.

3. As a compound of claim 2; 8,9-dihydro-6a-methyl-2-phenyl-5H,6aH - oxazolo[2,3 - b]pyrimido[4,5 - d][1,3]oxazin-5-one.

4. As a compound of claim 2; 8,9-dihydro-6a,8-dimethyl-2-phenyl-5H,6aH-oxazolo[2,3-b]pyrimido[4,5 - d][1,3]oxazin-5-one.

5. As a compound of claim 2; 8-(o-chlorophenyl)-8,9-dihydro-6a-methyl - 2 - phenyl - 5H,6aH - oxazolo[2,3-b]pyrimido[4,5-d][1,3]oxazin-5-one.

6. As a compound of claim 2; 9-ethyl-8,9-dihydro-6a-methyl-2-phenyl-5H,6aH-oxazolo[2,3-b]pyrimido[4,5 - d][1,3]oxazin-5-one.

7. As a compound of claim 2; 8,9-dihydro-6a,8,8-trimethyl-2-phenyl-5H,6aH-oxazolo[2,3-b]pyrimido[4,5 - d][1,3]oxazin-5-one.

References Cited

UNITED STATES PATENTS 3,274,191  9/1966  Cragoe et al. _____ 260—244

OTHER REFERENCES

Bradsher et al., J. Heter. Chem. vol. 4, pp. 66–70 (1967).

NATALIE TROUSOF, Primary Examiner

U.S. Cl. X.R.

260—256.4; 424—248

UNITED STATES PATENT OFFICE
CERTIFICATE OF CORRECTION

Patent No. 3,563,984   Dated February 16, 1971

Inventor(s) Dong H. Kim and Arthur A. Santilli

It is certified that error appears in the above-identified patent and that said Letters Patent are hereby corrected as shown below:

Column 1, line 3; the name of the second inventor has been misspelled and should read -- "Arthur A. Santilli" --;

Column 6, line 30; in claim 2 the Nitrogen in the upper right hand corner of the structure should be an Oxygen and the structure should read

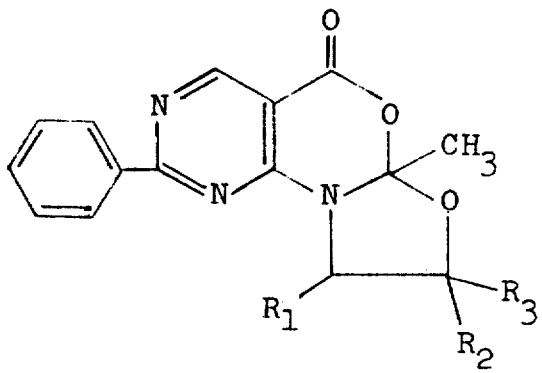

Signed and sealed this 17th day of August 1971.

(SEAL)
Attest:

EDWARD M. FLETCHER, JR.
Attesting Officer

WILLIAM E. SCHUYLER, JR.
Commissioner of Patents